May 1, 1928.
H. O. BURGIN
VACUUM TANK
Filed June 29, 1927
1,668,394
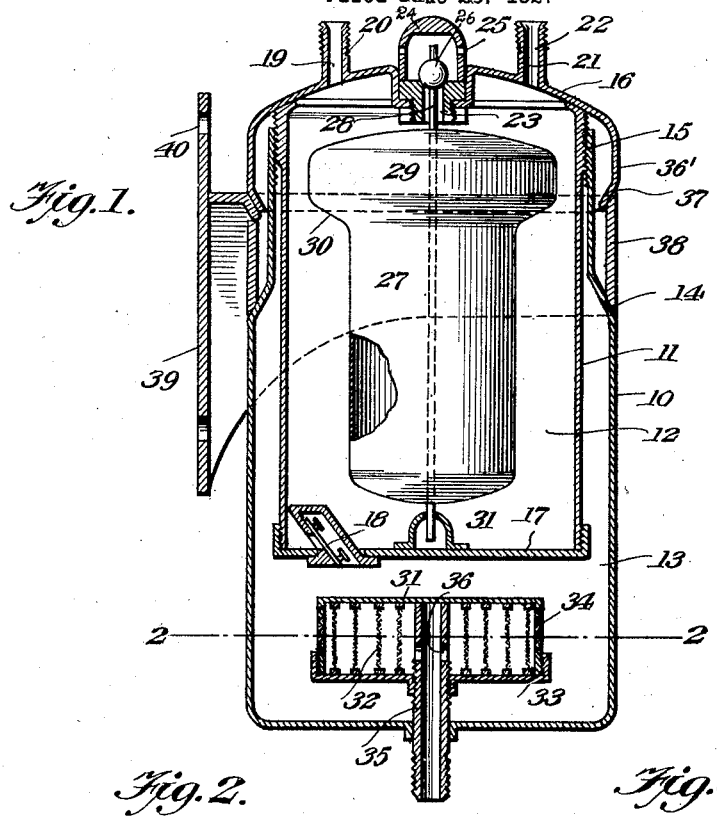
Fig. 1.
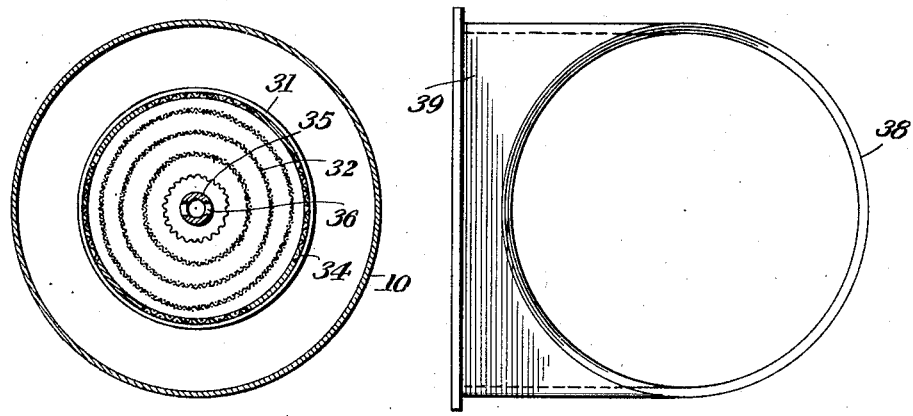
Fig. 2.
Fig. 3.
Harold O. Burgin
INVENTOR
BY Victor J. Evans
ATTORNEY Patented May 1, 1928.

1,668,394

UNITED STATES PATENT OFFICE.

HAROLD O. BURGIN, OF SANTA BARBARA, CALIFORNIA.

VACUUM TANK.

Application filed June 29, 1927. Serial No. 202,397.

This invention relates to vacuum feed tanks and has for an object the provision of a tank of novel construction, in which the float chamber is effectually sealed through the medium of the gasoline or other liquid within the tank.

Another object of the invention is the provision of a tank in which the valve controlling the admission of air is directly and rigidly connected with the float and arranged to open only after the admission of an appreciable quantity of gasoline the suction through the suction line acting to hold the valve seated until the said suction is overcome by the buoyancy of the float.

Another object of the invention is the provision of a novel form of float which has a greater lifting surface area at the top, so that the lifting action of the float will be suddenly increased when the liquid reaches a predetermined height in the float chamber and the air control valve will be suddenly opened.

Another object of the invention is the provision of novel means for supporting the tank in position for use.

A further object of the invention is the provision of a filter or screen which may be easily reached and conveniently taken apart for cleaning.

With the above and other objects in view, the invention further includes the following novel features and details of construction, to be hereinafter more fully described, illustrated in the accompanying drawings and pointed out in the appended claims.

In the drawings:—

Figure 1 is a sectional view of a vacuum tank constructed in accordance with the invention and shown arranged within its supporting bracket.

Figure 2 is a section on the line 2—2 of Figure 1.

Figure 3 is a detail plan view of the bracket.

Referring to the drawings in detail wherein like characters of reference denote corresponding parts the tank is shown as comprising an outer casing 10 and an inner casing 11, the latter defining a float chamber 12, while the casings 10 and 11 are spaced apart to provide an outer or discharge chamber 13.

The casing 10 is reduced in circumference at its upper open end and provides an annular shoulder 14, while the casing 12 extends downward into the casing 10 and has a threaded engagement therewith as shown at 15, so that the two casings are detachably connected. The inner casing or float chamber is closed by a permanent cap 16 which may be formed integral with the casing or connected thereby in any suitable manner. The lower end of the casing is provided with a removable cap 17 which is threadedly secured in place and this cap is provided with a suction controlled outlet valve 18. The cap 16 is provided with a port 19 for the admission of fuel and this port is surrounded by a nipple 20 for connection with the fuel line. A port 21 is also provided in the cap 16 and this port is likewise provided with a nipple 22 for connection in the suction line. In addition, there is provided an air inlet port 23 which is surrounded by a cage 24 and this cage is provided with air inlet openings 25. A valve 26 is arranged within the cage to control the port 23.

Located within the chamber 12 is a float 27 of any suitable material and this float has secured thereto a stem or rod 28 to which the valve 26 is connected, so that the valve has a direct and rigid connection with the float. The upper end of the float is circumferentially enlarged as at 29 so as to provide an increased lifting surface 30. The stem 28 has its lower end operating within a guide 31.

Located within the discharge chamber 13 is a filter 31 which includes circumferentially arranged annular screens 32 and a removable cap 33, the outermost screen 34 being of a relatively course mesh. The filter is supported by a short pipe section 35 having openings 36, so that liquid may pass through the screen and into the pipe 35 whose outer end is designed to be connected to a carbureter.

The cap 16 includes an annular flange 36 whose edge is beveled as indicated at 37 and this beveled edge is spaced from and opposed to the shoulder 14 so as to engage and clamp between this beveled edge and the said shoulder, an annulus 38. This annulus is carried by a bracket 39 having openings 40 therein for the passage of fastening devices.

In the operation of the tank, when the valve 26 is resting upon its seat to close the port 23, suction through the suction line and the port 21 will create a vacuum or partial vacuum within the float chamber 12. Fuel will thus be drawn into the float chamber through the port 19 and when the fuel reaches a predetermined level in the said chamber, the float 27 will rise and lift the valve 26 from its seat. The vacuum within the chamber will thus be broken and the valve 18 will be permitted to open so that the contents of the chamber 12 are discharged into the chamber 13, from where it passes outward through the filter 31 and the pipe 35.

Particular attention however is directed to the fact that the weight of the float is such that assisted by the vacuum or partial vacuum within the float chamber, the float will not rise until the liquid reaches the lifting surface 30. The buoyancy of the float is thus suddenly increased, so that the valve 26 is suddenly lifted from its seat, upward movement being limited by contact of the upper end of the float with the portion of the cap surrounding the port 23. The float and valve remain in elevated position with the air passing into the float chamber through the port 23, until the gasoline level falls to a point approximately midway the height of the float chamber. At this point, the weight of the float and the valve will cause the float to descend and seat the valve.

The lower end of the inner casing or float chamber 12 is thus always submerged and a liquid seal of the float chamber is thus obtained.

As the cap 16 forms a permanent part of the inner casing 11, and as the outer casing 10 has a threaded connection with the inner casing, the tank may be readily removed from the bracket and disassembled when desired.

While the tank is primarily intended for controlling the supply of fuel to an internal combustion engine, the tank may also be used as an oil filter.

It will be apparent from the foregoing description and accompanying drawings that the invention provides a vacuum feed tank of an exceedingly simple construction, having relatively few moving parts. In addition, the construction is such as to insure rigid and hence longer life.

The invention is susceptible of various changes in its form, proportions and minor details of construction and the right is herein reserved to make such changes as properly fall within the scope of the appended claims.

Having described my invention what is claimed is:—

1. In a vacuum feed tank, an outer casing open at the top, an inner casing extending downwardly into and threadedly engaging the upper part of the outer casing and open at the bottom, a permanent cap forming a closure for the top of the inner casing and having a fuel intake port and a suction port therein, an air intake port also provided in the cap, a valve to control the air intake port, a float within the inner chamber and associated with the valve to control the latter, a cap closing the lower end of the inner casing and a valve controlled outlet for said inner casing.

2. In a vacuum feed tank, an outer casing, an inner casing, a cap closing the top of the inner casing and having a fuel intake port, a suction port and an air intake port, a valve controlled outlet for the inner casing, a float operated valve for controlling the air intake port, an outlet port for the outer casing, an annular shoulder provided upon the outer casing adjacent the top, a flange extending around the cap of the inner casing and spaced from the shoulder, a supporting bracket including an annular member adapted to receive the tank and means detachably connecting the inner and outer casings whereby the annular member of the bracket may be clamped between the shoulder of the outer casing and the flange of the tank.

3. In a vacuum feed tank having an outer casing, an inner casing, an annular shoulder upon the outer casing, an annular flange rigid with the inner casing and spaced above and opposed to the annular shoulder, a supporting bracket, an annular member carried thereby and adapted to receive the tank and means to detachably connect the inner and outer casings to clamp the annular member between the shoulder and flange.

4. In a vacuum feed tank having an outer casing, an inner casing, an annular shoulder upon the outer casing, an annular flange rigid with the inner casing and spaced above and opposed to the annular shoulder, a supporting bracket, an annular member carried thereby and adapted to receive the tank and means to adjustably and detachably connect the inner and outer casings to clamp the annular member between the shoulder and flange.

In testimony whereof I affix my signature.

HAROLD O. BURGIN.